(12) United States Patent
Sahni et al.

(10) Patent No.: US 10,613,274 B2
(45) Date of Patent: Apr. 7, 2020

(54) METHOD AND SYSTEM FOR INTEGRATED MULTI-PORT WAVEGUIDE PHOTODETECTORS

(71) Applicant: Luxtera, Inc., Carlsbad, CA (US)

(72) Inventors: Subal Sahni, La Jolla, CA (US); Gianlorenzo Masini, Carlsbad, CA (US); Attila Mekis, Carlsbad, CA (US)

(73) Assignee: Luxtera, Inc., Carlsbad, CA (US)

( * ) Notice: Subject to any disclaimer, the term of this patent is extended or adjusted under 35 U.S.C. 154(b) by 336 days.

(21) Appl. No.: 15/592,774

(22) Filed: May 11, 2017

(65) Prior Publication Data
US 2017/0329080 A1    Nov. 16, 2017

Related U.S. Application Data

(60) Provisional application No. 62/336,110, filed on May 13, 2016.

(51) Int. Cl.
*G02B 6/122* (2006.01)
*G02B 6/124* (2006.01)
(Continued)

(52) U.S. Cl.
CPC ......... *G02B 6/122* (2013.01); *G02B 6/12004* (2013.01); *G02B 6/124* (2013.01);
(Continued)

(58) Field of Classification Search
CPC ...... G02B 6/12; G02B 6/12004; G02B 6/122; G02B 6/1228; G02B 6/124; G02B 6/125;
(Continued)

(56) References Cited

U.S. PATENT DOCUMENTS 7,183,759 B1 *   2/2007   Malendevich ..... G02B 6/12007
                                                    324/750.22
7,397,101 B1 *   7/2008   Masini ................. H01L 31/028
                                                    257/184
(Continued)

FOREIGN PATENT DOCUMENTS

WO        2008122607        10/2008
WO        2010107439         3/2009
(Continued)

OTHER PUBLICATIONS

Official Action for EP Application No. 17 170845.6-1003 dated Feb. 13, 2019.

*Primary Examiner* — John R Lee
(74) *Attorney, Agent, or Firm* — McAndrews, Held & Malloy

(57) ABSTRACT

Methods and systems for integrated multi-port waveguide photodetectors are disclosed and may include an optical receiver on a chip, where the optical receiver comprises a multi-port waveguide photodetector having three or more input ports. The optical receiver may be operable to receive optical signals via one or more grating couplers, couple optical signals to the photodetector via optical waveguides in the chip, and generate an output electrical signal based on the coupled optical signals using the photodetector. The photodetector may include four ports coupled to two PSGCs. The optical signals may be coupled to the photodetector via S-bends and/or tapers at ends of the optical waveguides. A width of the photodetector on sides that are coupled to the optical waveguides may be wider than a width of the optical waveguides coupled to the sides. Optical signals may be mixed with local oscillator signals using the multi-port waveguide photodetector.

24 Claims, 10 Drawing Sheets

(51) Int. Cl.
  *G02B 6/125* (2006.01)
  *G02B 6/126* (2006.01)
  *G02B 6/27* (2006.01)
  *G02B 6/42* (2006.01)
  *H04B 10/69* (2013.01)
  *G02B 6/12* (2006.01)
  *H04B 10/25* (2013.01)
  *H04B 10/40* (2013.01)
  *H04B 10/80* (2013.01)

(52) U.S. Cl.
  CPC .............. *G02B 6/125* (2013.01); *G02B 6/126* (2013.01); *G02B 6/1228* (2013.01); *G02B 6/2773* (2013.01); *G02B 6/4215* (2013.01); *G02B 6/4286* (2013.01); *H04B 10/40* (2013.01); *H04B 10/691* (2013.01); *H04B 10/801* (2013.01); *G02B 2006/12123* (2013.01); *H04B 10/25* (2013.01)

(58) Field of Classification Search
  CPC . G02B 6/126; G02B 6/26; G02B 6/27; G02B 6/2773; G02B 6/42; G02B 6/4215; G02B 6/4286; G02B 2006/12123; H04B 10/25; H04B 10/40; H04B 10/60; H04B 10/66; H04B 10/69; H04B 10/691; H04B 10/801
  See application file for complete search history.

(56) References Cited

U.S. PATENT DOCUMENTS

| | | | | |
|---|---|---|---|---|
| 8,676,003 B2 * | 3/2014 | Roelkens | ........... | G02B 6/29397 385/14 |
| 2004/0184156 A1 * | 9/2004 | Gunn, III | ............. | G02B 6/1228 359/629 |
| 2005/0031259 A1 * | 2/2005 | Shen | ................. | H04B 10/0795 385/24 |
| 2008/0138008 A1 * | 6/2008 | Tolstikhin | ............ | G02B 6/1228 385/14 |
| 2010/0166427 A1 * | 7/2010 | Jeong | ................. | G02B 6/12004 398/82 |
| 2010/0290735 A1 * | 11/2010 | Joyner | ............... | G02B 6/12004 385/14 |
| 2010/0322555 A1 * | 12/2010 | Vermeulen | ......... | G02B 6/12007 385/28 |
| 2012/0045173 A1 * | 2/2012 | Doerr | .................. | G02B 6/12004 385/37 |
| 2012/0205524 A1 * | 8/2012 | Mack | ................... | H04B 10/503 250/225 |
| 2013/0105840 A1 * | 5/2013 | Min | ..................... | G02B 6/12004 257/98 |
| 2013/0330038 A1 * | 12/2013 | Onishi | .................. | G02B 6/262 385/31 |
| 2014/0212137 A1 * | 7/2014 | Watanabe | ............ | G02B 6/4215 398/65 |
| 2015/0117865 A1 * | 4/2015 | Sonoda | ............ | H04B 10/07955 398/140 |
| 2015/0260913 A1 * | 9/2015 | Li | ...................... | G02B 6/12004 385/14 |
| 2015/0277042 A1 * | 10/2015 | Goodwill | ................ | G02B 6/126 385/11 |
| 2016/0036550 A1 * | 2/2016 | Welch | ..................... | H04J 14/02 398/87 |
| 2016/0124147 A1 * | 5/2016 | Chang | ................ | G02B 6/12004 385/14 |
| 2016/0202423 A1 * | 7/2016 | Li | ............................ | G02B 6/34 385/11 |
| 2017/0003451 A1 * | 1/2017 | Ma | ......................... | G02B 6/125 |
| 2017/0329080 A1 * | 11/2017 | Sahni | .................... | G02B 6/122 |

FOREIGN PATENT DOCUMENTS

| | | |
|---|---|---|
| WO | 2015047193 | 2/2015 |
| WO | 2015116063 | 8/2015 |

* cited by examiner

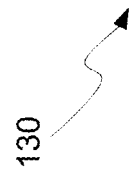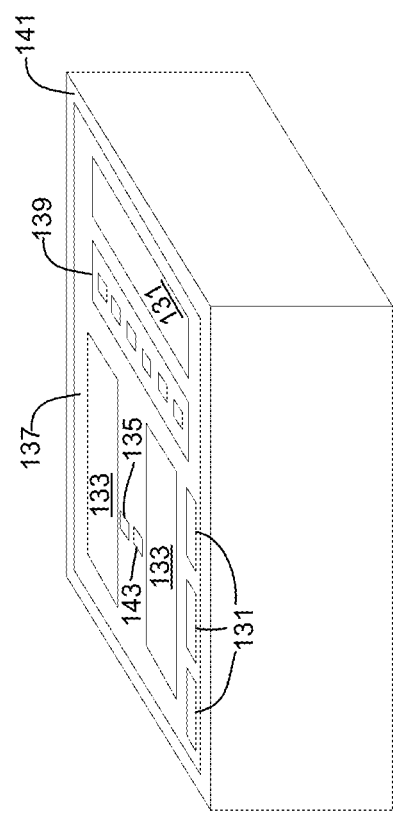
FIG. 1B

METHOD AND SYSTEM FOR INTEGRATED MULTI-PORT WAVEGUIDE PHOTODETECTORS

CROSS-REFERENCE TO RELATED APPLICATIONS/INCORPORATION BY REFERENCE

This application claims priority to and the benefit of U.S. Provisional Application 62/336,110 filed on May 13, 2016, which is hereby incorporated herein by reference in its entirety.

TECHNICAL FIELD

Aspects of the present disclosure relate to electronic components. More specifically, certain implementations of the present disclosure relate to methods and systems for integrated multi-port waveguide photodetectors.

BACKGROUND

As data networks scale to meet ever-increasing bandwidth requirements, the shortcomings of copper data channels are becoming apparent. Signal attenuation and crosstalk due to radiated electromagnetic energy are the main impediments encountered by designers of such systems. They can be mitigated to some extent with equalization, coding, and shielding, but these techniques require considerable power, complexity, and cable bulk penalties while offering only modest improvements in reach and very limited scalability. Free of such channel limitations, optical communication has been recognized as the successor to copper links.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

System and methods are provided for integrated multi-port waveguide photodetectors, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

BRIEF DESCRIPTION OF SEVERAL VIEWS OF THE DRAWINGS

FIG. 1B is a diagram illustrating an exemplary photonically-enabled integrated circuit, in accordance with an example embodiment of the disclosure.

DETAILED DESCRIPTION

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry or a device is "operable" to perform a function whenever the circuitry or device comprises the necessary hardware and code (if any is necessary) to perform the function, regardless of whether performance of the function is disabled or not enabled (e.g., by a user-configurable setting, factory trim, etc.).

Figure 1A:
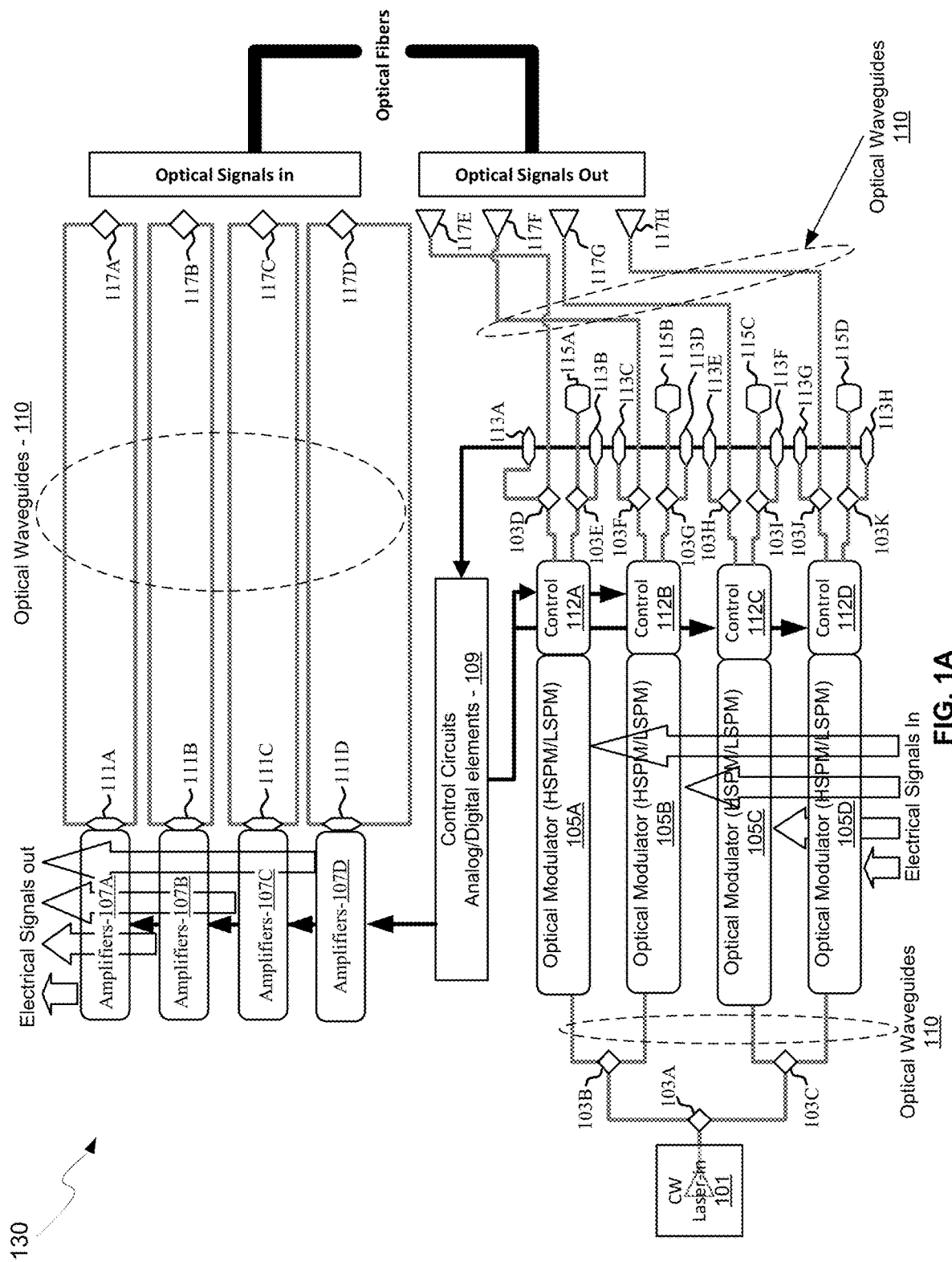
FIG. 1A is a block diagram of a photonically-enabled integrated circuit with optical phase modulators with high modal overlap, in accordance with an example embodiment of the disclosure.

FIG. 1A is a block diagram of a photonically-enabled integrated circuit with integrated multi-port waveguide photodetectors, in accordance with an example embodiment of the disclosure. Referring to FIG. 1A, there is shown optoelectronic devices on a photonically-enabled integrated circuit 130 comprising optical modulators 105A-105D, photodiodes 111A-111D, monitor photodiodes 113A-113H, and optical devices comprising couplers 103A-103K, optical terminations 115A-115D, and grating couplers 117A-117H. There are also shown electrical devices and circuits comprising amplifiers 107A-107D, analog and digital control circuits 109, and control sections 112A-112D. The amplifiers 107A-107D may comprise transimpedance and limiting amplifiers (TIA/LAs), for example.

In an example scenario, the photonically-enabled integrated circuit 130 comprises a CMOS photonics die with a laser assembly 101 coupled to the top surface of the IC 130. The laser assembly 101 may comprise one or more semiconductor lasers with isolators, lenses, and/or rotators within for directing one or more CW optical signals to the coupler 103A. The photonically enabled integrated circuit 130 may comprise a single chip, or may be integrated on a plurality of die, such as with one or more electronics die and one or more photonics die.

Optical signals are communicated between optical and optoelectronic devices via optical waveguides 110 fabricated in the photonically-enabled integrated circuit 130. Single-mode or multi-mode waveguides may be used in photonic integrated circuits. Single-mode operation enables direct connection to optical signal processing and networking elements. The term "single-mode" may be used for waveguides that support a single mode for each of the two polarizations, transverse-electric (TE) and transverse-magnetic (TM), or for waveguides that are truly single mode and only support one mode whose polarization is TE, which comprises an electric field parallel to the substrate supporting the waveguides. Two typical waveguide cross-sections that are utilized comprise strip waveguides and rib waveguides. Strip waveguides typically comprise a rectangular cross-section, whereas rib waveguides comprise a rib section on top of a waveguide slab. Of course, other waveguide cross section types are also contemplated and within the scope of the disclosure.

In an example scenario, the couplers 103A-103C may comprise low-loss Y-junction power splitters where coupler 103A receives an optical signal from the laser assembly 101 and splits the signal to two branches that direct the optical signals to the couplers 103B and 103C, which split the optical signal once more, resulting in four roughly equal power optical signals.

The optical power splitter, may comprise at least one input waveguide and at least two output waveguides. The couplers 103A-103C shown in FIG. 1A illustrates 1-by-2 splitters, which divide the optical power in one waveguide into two other waveguides evenly. These Y-junction splitters may be used in multiple locations in an optoelectronic system, such as in a Mach-Zehnder interferometer (MZI) modulator, e.g., the optical modulators 105A-105D, where a splitter and a combiner are needed, since a power combiner can be a splitter used in reverse.

In another example scenario, the Y-junction may be utilized in a parallel multi-channel transmitter, where a cascade of 1-by-2 splitters can be employed to have a single light source feed multiple channels. Interleaver-based multiplexers and demultiplexers constitute a third example where 1-by-2 splitters are among the building blocks.

The optical modulators 105A-105D comprise Mach-Zehnder or ring modulators, for example, and enable the modulation of the continuous-wave (CW) laser input signal. The optical modulators 105A-105D may comprise high-speed and low-speed phase modulation sections and are controlled by the control sections 112A-112D. The high-speed phase modulation section of the optical modulators 105A-105D may modulate a CW light source signal with a data signal. The low-speed phase modulation section of the optical modulators 105A-105D may compensate for slowly varying phase factors such as those induced by mismatch between the waveguides, waveguide temperature, or waveguide stress and is referred to as the passive phase, or the passive biasing of the MZI.

In an example scenario, the high-speed optical phase modulators may operate based on the free carrier dispersion effect and may demonstrate a high overlap between the free carrier modulation region and the optical mode. High-speed phase modulation of an optical mode propagating in a waveguide is the building block of several types of signal encoding used for high data rate optical communications. Speed in the several Gb/s may be required to sustain the high data rates used in modern optical links and can be achieved in integrated Si photonics by modulating the depletion region of a PN junction placed across the waveguide carrying the optical beam. In order to increase the modulation efficiency and minimize the loss, the overlap between the optical mode and the depletion region of the PN junction must be carefully optimized.

The outputs of the optical modulators 105A-105D may be optically coupled via the waveguides 110 to the grating couplers 117E-117H. The couplers 103D-103K may comprise four-port optical couplers, for example, and may be utilized to sample or split the optical signals generated by the optical modulators 105A-105D, with the sampled signals being measured by the monitor photodiodes 113A-113H. The unused branches of the directional couplers 103D-103K may be terminated by optical terminations 115A-115D to avoid back reflections of unwanted signals.

The grating couplers 117A-117H comprise optical gratings that enable coupling of light into and out of the photonically-enabled integrated circuit 130. The grating couplers 117A-117D may be utilized to couple light received from optical fibers into the photonically-enabled integrated circuit 130, and the grating couplers 117E-117H may be utilized to couple light from the photonically-enabled integrated circuit 130 into optical fibers. The grating couplers 117A-117H may comprise single polarization grating couplers (SPGC) and/or polarization splitting grating couplers (PSGC). In instances where a PSGC is utilized, two input, or output, waveguides may be utilized.

The optical fibers may be epoxied, for example, to the CMOS chip, and may be aligned at an angle from normal to the surface of the photonically-enabled integrated circuit 130 to optimize coupling efficiency. In an example embodiment, the optical fibers may comprise single-mode fiber (SMF) and/or polarization-maintaining fiber (PMF).

In another exemplary embodiment illustrated in FIG. 1B, optical signals may be communicated directly into the surface of the photonically-enabled integrated circuit 130 without optical fibers by directing a light source on an optical coupling device in the chip, such as the light source interface 135 and/or the optical fiber interface 139. This may be accomplished with directed laser sources and/or optical sources on another chip flip-chip bonded to the photonically-enabled integrated circuit 130.

The photodiodes 111A-111D may convert optical signals received from the grating couplers 117A-117D into electrical signals that are communicated to the amplifiers 107A-107D for processing. In another embodiment of the disclosure, the photodiodes 111A-111D may comprise high-speed heterojunction phototransistors, for example, and may comprise germanium (Ge) in the collector and base regions for absorption in the 1.3-1.6 µm optical wavelength range, and may be integrated on a CMOS silicon-on-insulator (SOI) wafer.

In the receiver subsystem implemented in a silicon chip, light is often coupled into a photodetector via a polarization-splitting grating coupler that supports coupling all polarization states of the fiber mode efficiently. The incoming signal is split by the PSGC into two separate waveguides in a polarization-diversity scheme, and therefore both inputs to the waveguide photodetectors are used. If two different PSGCs are required to couple into the same photodetector, then the PD needs to have four separate waveguide ports. However, a straight waveguide intrinsically has only two ports. In an example embodiment of the disclosure, a multi-port waveguide photodetector is described for receiving optical signals from a plurality of waveguides, as shown further with respect to FIGS. 2-6

The analog and digital control circuits 109 may control gain levels or other parameters in the operation of the amplifiers 107A-107D, which may then communicate electrical signals off the photonically-enabled integrated circuit 130. The control sections 112A-112D comprise electronic circuitry that enable modulation of the CW laser signal received from the splitters 103A-103C. The optical modulators 105A-105D may require high-speed electrical signals to modulate the refractive index in respective branches of a Mach-Zehnder interferometer (MZI), for example. In an example embodiment, the control sections 112A-112D may include sink and/or source driver electronics that may enable a bidirectional link utilizing a single laser.

In operation, the photonically-enabled integrated circuit 130 may be operable to transmit and/or receive and process optical signals. Optical signals may be received from optical fibers by the grating couplers 117A-117D and converted to electrical signals by the photodetectors 111A-111D. The electrical signals may be amplified by transimpedance amplifiers in the amplifiers 107A-107D, for example, and subsequently communicated to other electronic circuitry, not shown, in the photonically-enabled integrated circuit 130.

Integrated photonics platforms allow the full functionality of an optical transceiver to be integrated on a single chip. An optical transceiver chip contains optoelectronic circuits that create and process the optical/electrical signals on the transmitter (Tx) and the receiver (Rx) sides, as well as optical interfaces that couple the optical signals to and from a fiber. The signal processing functionality may include modulating the optical carrier, detecting the optical signal, splitting or combining data streams, and multiplexing or demultiplexing data on carriers with different wavelengths.

FIG. 1B is a diagram illustrating an exemplary photonically-enabled integrated circuit, in accordance with an example embodiment of the disclosure. Referring to FIG. 1B, there is shown the photonically-enabled integrated circuit 130 comprising electronic devices/circuits 131, optical and optoelectronic devices 133, a light source interface 135, a chip front surface 137, an optical fiber interface 139, CMOS guard ring 141, and a surface-illuminated monitor photodiode 143.

The light source interface 135 and the optical fiber interface 139 comprise grating couplers, for example, that enable coupling of light signals via the CMOS chip surface 137, as opposed to the edges of the chip as with conventional edge-emitting/receiving devices. Coupling light signals via the chip surface 137 enables the use of the CMOS guard ring 141 which protects the chip mechanically and prevents the entry of contaminants via the chip edge.

The electronic devices/circuits 131 comprise circuitry such as the amplifiers 107A-107D and the analog and digital control circuits 109 described with respect to FIG. 1A, for example. The optical and optoelectronic devices 133 comprise devices such as the couplers 103A-103K, optical terminations 115A-115D, grating couplers 117A-117H, optical modulators 105A-105D, high-speed heterojunction photodiodes 111A-111D, and monitor photodiodes 113A-113I.

Figure 1C:
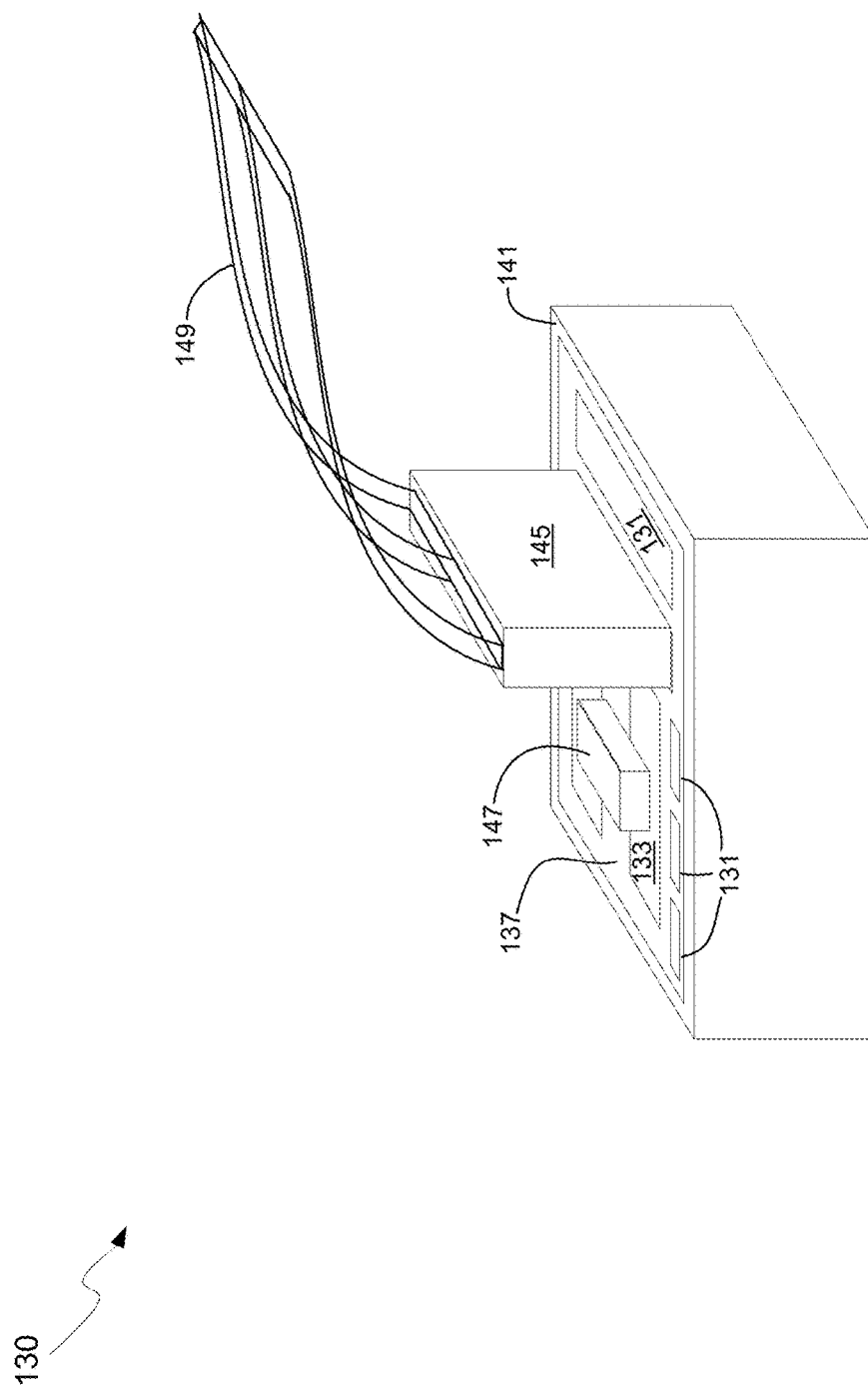
FIG. 1C is a diagram illustrating a photonically-enabled integrated circuit coupled to an optical fiber cable, in accordance with an example embodiment of the disclosure.

FIG. 1C is a diagram illustrating a photonically-enabled integrated circuit coupled to an optical fiber cable, in accordance with an example embodiment of the disclosure. Referring to FIG. 1C, there is shown the photonically-enabled integrated circuit 130 comprising the chip surface 137, and the CMOS guard ring 141. There is also shown a fiber-to-chip coupler 145, an optical fiber cable 149, and an optical source assembly 147.

The photonically-enabled integrated circuit 130 comprises the electronic devices/circuits 131, the optical and optoelectronic devices 133, the light source interface 135, the chip surface 137, and the CMOS guard ring 141 may be as described with respect to FIG. 1B.

In an example embodiment, the optical fiber cable may be affixed, via epoxy for example, to the CMOS chip surface 137. The fiber chip coupler 145 enables the physical coupling of the optical fiber cable 149 to the photonically-enabled integrated circuit 130.

Figure 2:
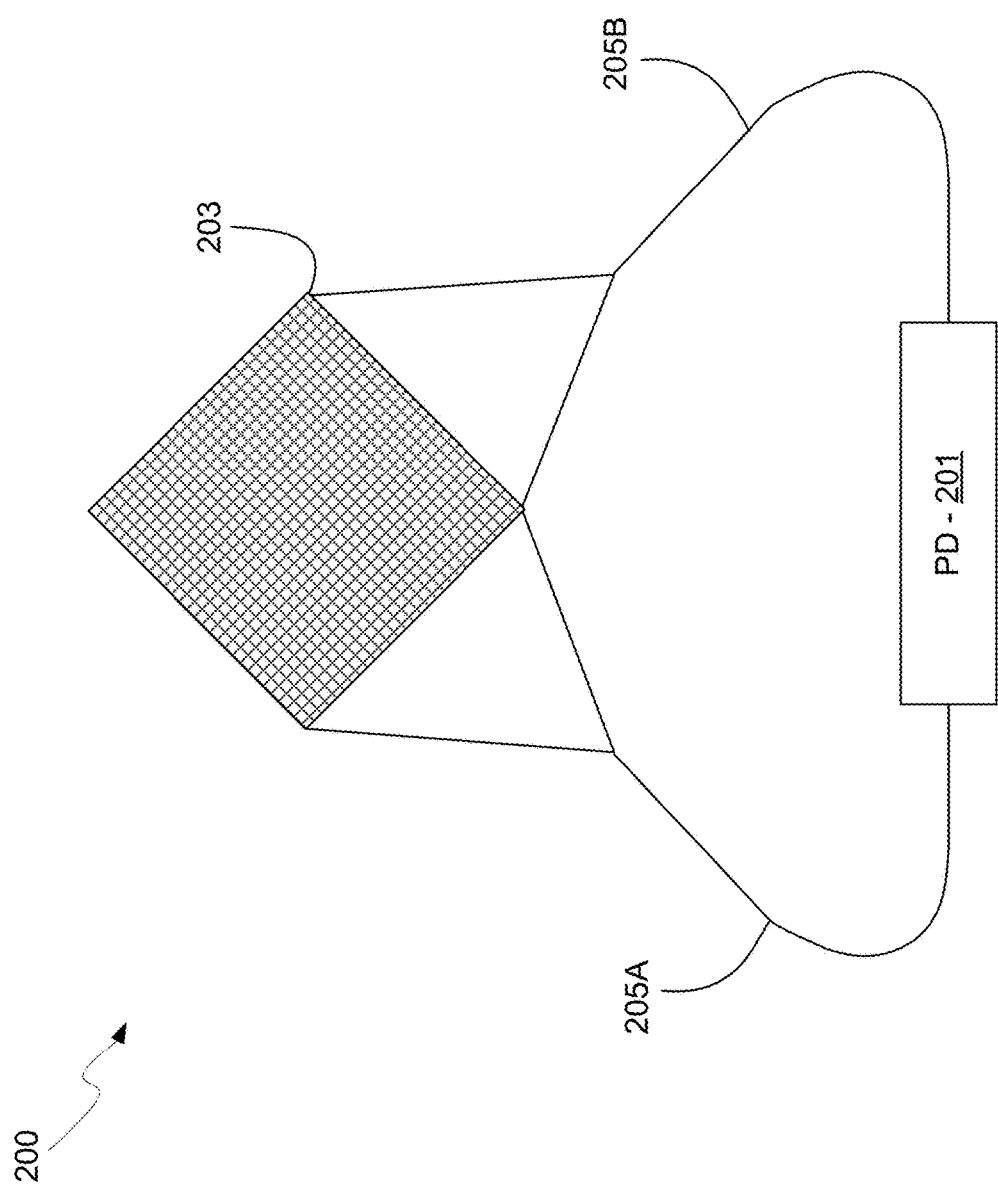
FIG. 2 illustrates a waveguide photodetector, in accordance with an example embodiment of the disclosure.

FIG. 2 illustrates a waveguide photodetector, in accordance with an example embodiment of the disclosure. Referring to FIG. 2, there is shown optical detector 200 comprising photodetector 201, polarization-splitting grating coupler (PSGC) 203, and waveguides 205A and 205B. An example waveguide photodetector is based on an absorbing germanium (Ge) layer grown on a silicon waveguide, where Ge absorbs wavelengths of light used in optical communications.

The PSGC 203 may comprise overlapping grating patterns designed to scatter light of different polarizations into each of the waveguides 205A and 205B. The PSGC 203 may comprise tapered sections for coupling optical signals into the width of the waveguides 205A and 205B. The waveguides 203A and 203B may comprise single mode waveguides for communicating optical signals on a photonics chip, as described with respect to FIGS. 1A-1C.

When the waveguides 205A and 205B supply two input optical signals, they may be fed into opposite sides of the photodetector 201, as shown in FIG. 2. However, when more than one PSGC is supplying optical signals, more inputs are needed, as illustrated in FIG. 3.

Figure 3:
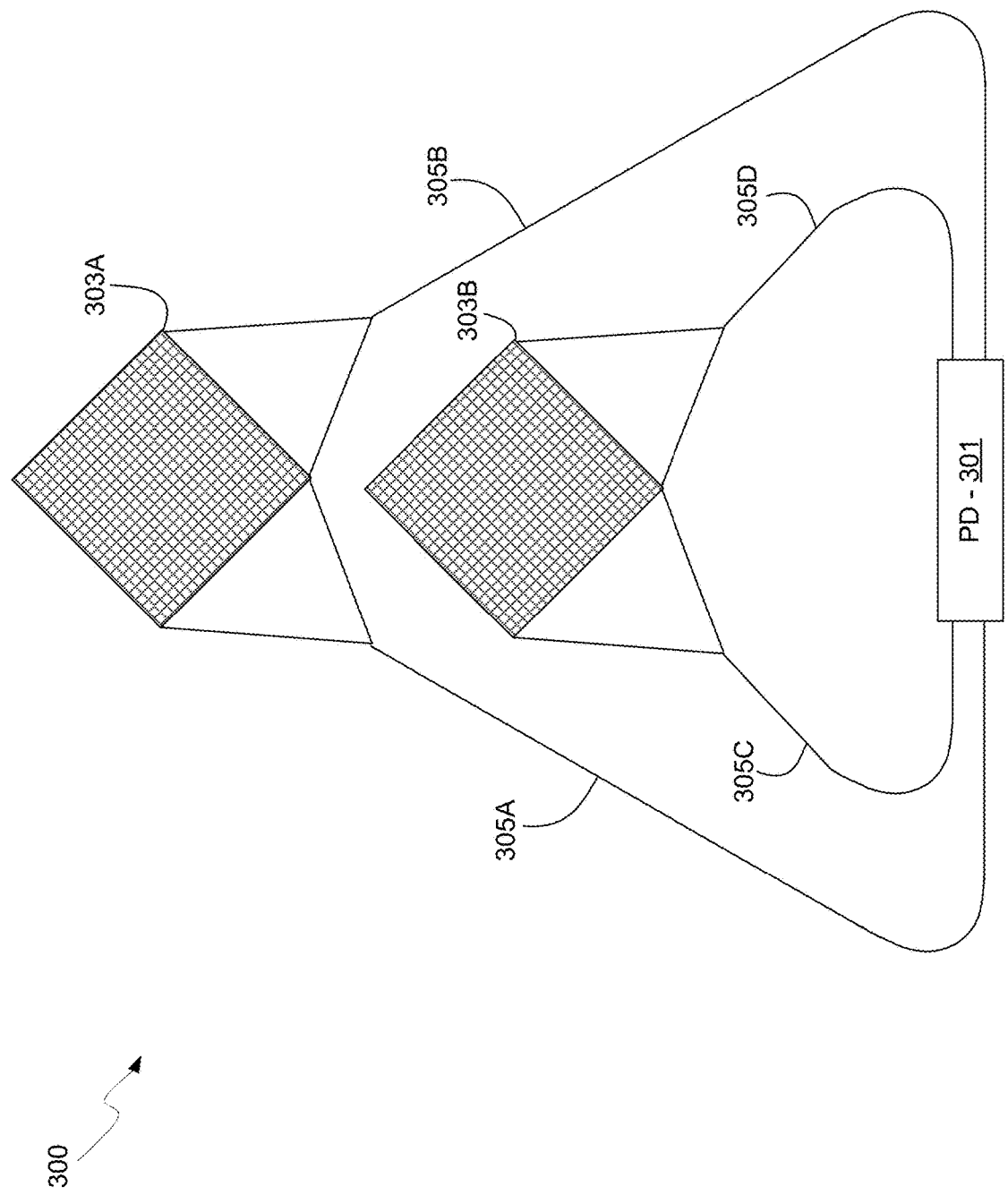
FIG. 3 illustrates a multi-port photodetector, in accordance with an example embodiment of the disclosure.

FIG. 3 illustrates a multi-port photodetector, in accordance with an example embodiment of the disclosure. Referring to FIG. 3, there is shown optical receiver 300 comprising a multi-port waveguide photodetector 301, a pair of PSGCs 303A and 303B, and optical waveguides 305A-305D.

The photodetector 301 may comprise a waveguide photodetector, which may be configured as a Ge photodiode, for example. The PSGCs 303A and 303B may comprise overlapping grating patterns designed to scatter light of different polarizations into each of the waveguides 305A-305D. The PSGCs 303A and 303B may comprise tapered sections for coupling optical signals into the width of the waveguides 305A-305D. The waveguides 305A-305D may comprise single mode waveguides for communicating optical signals on a photonics chip, as described with respect to FIGS. 1A-1C.

The PSGCs 303A and 303B may receive optical signals from one or more optical fibers and generate output optical signals of different polarizations which are communicated to the photodetector 301 via waveguides 305A-305D. The photodiode 301 then generates an electrical signal based on the received optical signals.

In an example embodiment of the disclosure, for proper signal reception, the photodetector 301 needs to be wide enough to receive optical signals from all four waveguides 305A-305D. In this manner, optical signals from four input optical fibers may be received by a single photodetector 301. The layout shown in FIG. 3 is merely an example. In an example scenario, the waveguides 305A-305D may have a width of 300-400 nm while the photodetector 301 has a width of ½ to 1 micron. Accordingly, the number of PSGCs and waveguides may be configured at any desired number, based on area constraints, for example. One example scenario for providing two PSGCs 303A and 303B is for receiver redundancy, in that if one PSGC has poor coupling efficiency with an optical source, such as a fiber, for example. Another example scenario would be to receive optical signals from both PSGCs, for example at different wavelengths and/or polarizations.

Figure 4:
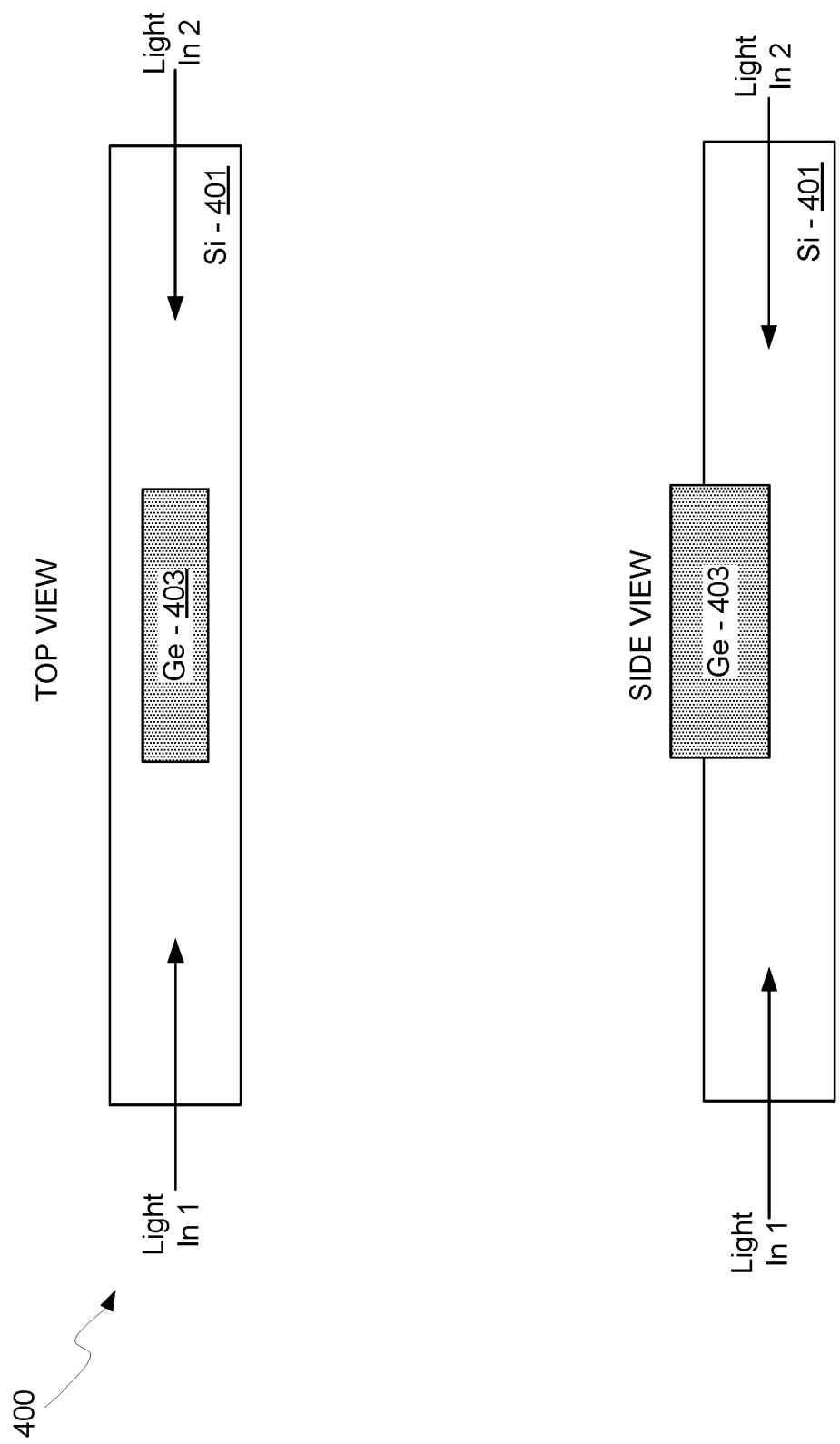
FIG. 4 illustrates top and side views of a two-port waveguide photodetector, in accordance with an example embodiment of the disclosure.

FIG. 4 illustrates top and side views of a two-port waveguide photodetector, in accordance with an example embodiment of the disclosure. Referring to FIG. 4, there is shown a germanium layer 403 and a silicon layer 401, where the silicon layer 401 provides optical waveguides to the absorbing structure, the germanium layer 403.

The arrows indicate the direction of light propagation, and the signal is absorbed in the germanium layer 403. The germanium region may be approximately the same width as a single-mode waveguide.

Figure 5:
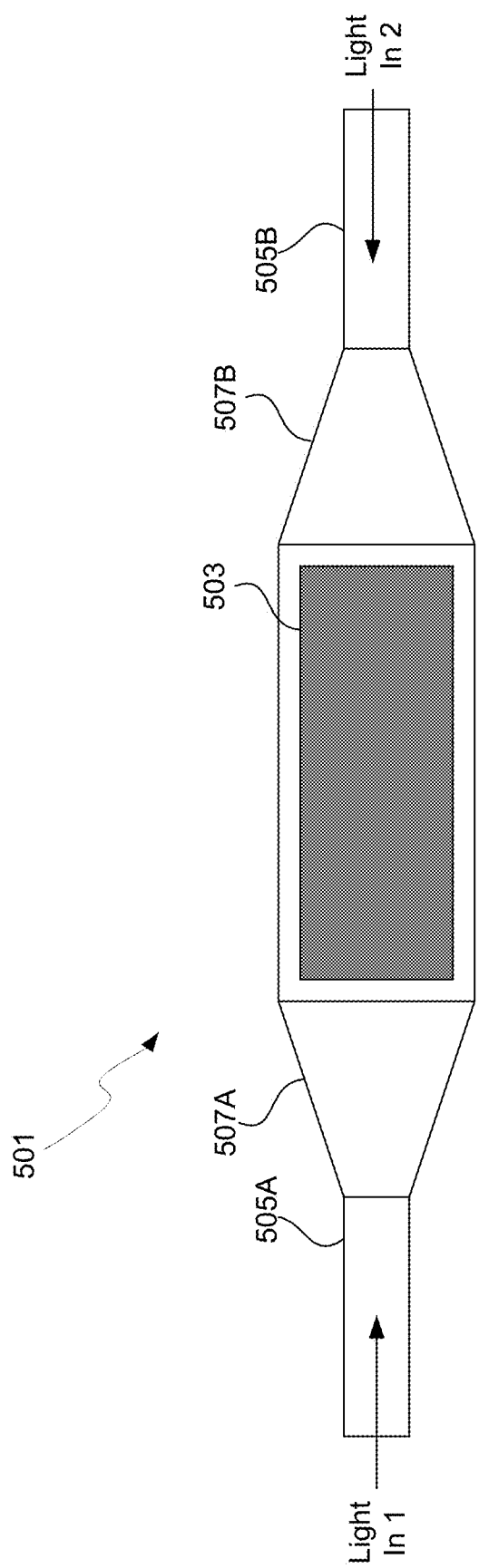
FIG. 5 illustrates a two-port waveguide photodetector with adiabatic tapers, in accordance with an example embodiment of the disclosure.

FIG. 5 illustrates a two-port waveguide photodetector with adiabatic tapers, in accordance with an example embodiment of the disclosure. Referring to FIG. 5, there is shown a top view of two-port waveguide photodetector 501 comprising a Ge region 503, taper regions 507A and 507B, and waveguides 505A and 505B.

The two-port waveguide detector 501 comprises a wider germanium cavity, using adiabatic tapers 507A and 507B, in that energy is not lost in the transition from waveguide width to Ge layer width, between the waveguides 505A and 505B and the wide germanium region 503. If the germanium region is sufficiently wide, it can support connections to two waveguides on one side, making it a four-port device, as illustrated in FIG. 6.

Figure 6:
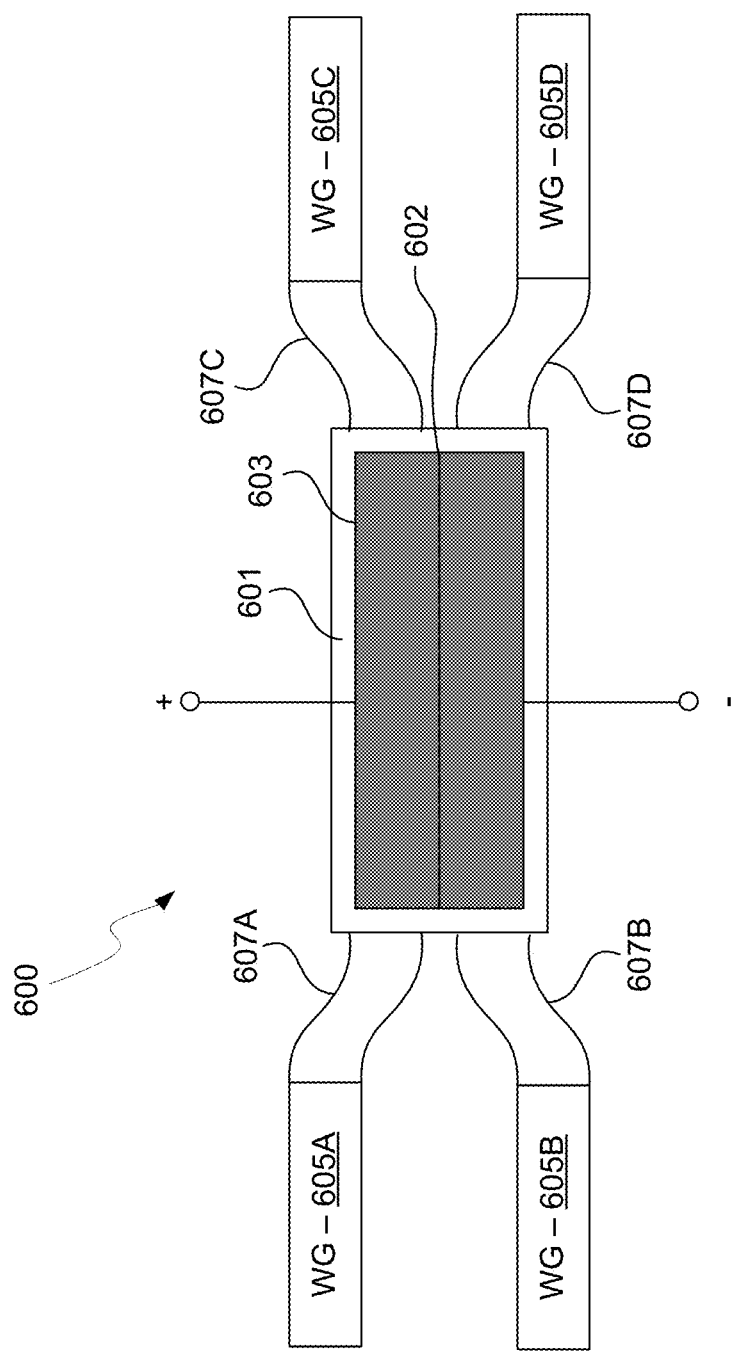
FIG. 6 illustrates a four-port waveguide photodetector, in accordance with an example embodiment of the disclosure.

FIG. 6 illustrates a four-port waveguide photodetector, in accordance with an example embodiment of the disclosure. Referring to FIG. 6, there is shown four-port waveguide photodetector 600 comprising a silicon layer 601, a Ge layer 603, and S-bends 607A-607D.

The four-port waveguide photodetector 601 comprises a Ge region 603 in and/or on silicon layer 601, where the Ge region 603 is wide enough to accommodate four input waveguides 605A-605D, with the S-bends 607A-607D comprising smooth curved sections of waveguide material, e.g., silicon, for coupling optical signals from the waveguides 605A-605D into the Ge layer 603.

The Ge region 603 may be doped p-type in one region and n-type in another region, and optionally with an intrinsic region between these doped regions for a PIN photodiode structure. The + and – connections for the photodetector 601 are shown functionally but do not indicate actual interconnects to the device. In the example shown in FIG. 6, the junction 602 formed by the p- and n-doped regions may be lateral, although it is also possible to have a vertical orientation of the doped regions.

Even though, in the example configuration shown in FIG. 6, none of the waveguides 605A-605D are centered in this configuration on the germanium region 603, such configuration does not affect the performance of the four-port waveguide photodetector 600 significantly, because the germanium film has a high absorption coefficient. The two waveguides 605A/605B and 605C/605D are brought close together on each side using S-bend 607A/607B and 607C/607D, respectively. FIG. 6 illustrates a top view of the structure, with the four waveguides 605A-605D coupling to the photodetector 600, and that comprises a wide germanium absorbing region, which in this example is wide enough for two waveguides on each side. Using a similar approach, the number of waveguides can be increased to any number beyond two. In an example scenario, the waveguides 605A-605D may have a width of 300-400 nm while the photodetector 601 has a width of 0.5 to 1 micron.

Figure 7:
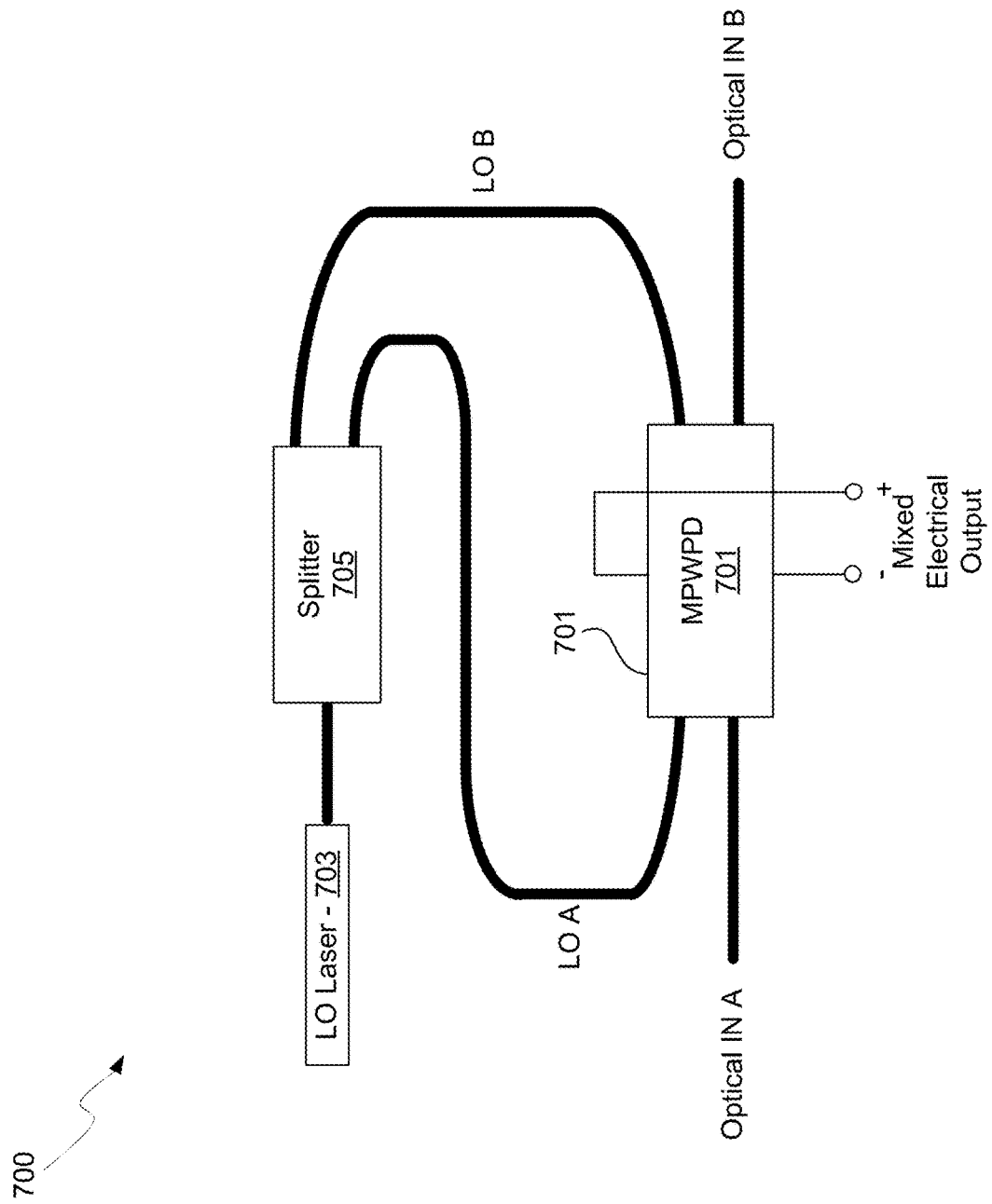
FIG. 7 illustrates a multi-port waveguide photodetector optical mixer, in accordance with an example embodiment of the disclosure.

FIG. 7 illustrates a multi-port waveguide photodetector optical mixer, in accordance with an example embodiment of the disclosure. Referring to FIG. 7, there is shown optical mixing photonic circuit 700 comprising a multi-port waveguide photodetector 701, an optical source 703, e.g., a directly modulated laser or a laser and modulator, and a splitter 705. There are also shown optical input signals A and B, local oscillator signals LO A and LO B, and a mixed electrical output.

The photodetector 701, the laser 703, and splitter 705, may be substantially similar to these elements described with respect to FIGS. 1A-6, for example, and with the laser 703 and splitter being operable to generate two or more modulated optical signals, the local oscillator signals LO A and LO B. These signals may be utilized to mix with the input optical signals A and B at the photodetector 701, thereby generating down-converted electrical signals. The signals LO A and LO B may be configured at a modulation frequency that is a desired frequency away from that of the input optical signals A and B, such that the resulting mixed electrical output of the photodetector 701 is a combination of desired down-converted frequencies, e.g., at a desired baseband frequency.

The multi-port waveguide photodetector 701 with four inputs enables such a mixing scheme with two optical inputs, as may be received from a PSGC or splitter, for example, and two LO optical signals. Furthermore, any number of input/LO signals may be mixed based on the number of optical inputs to the photodetector.

Figure 8:
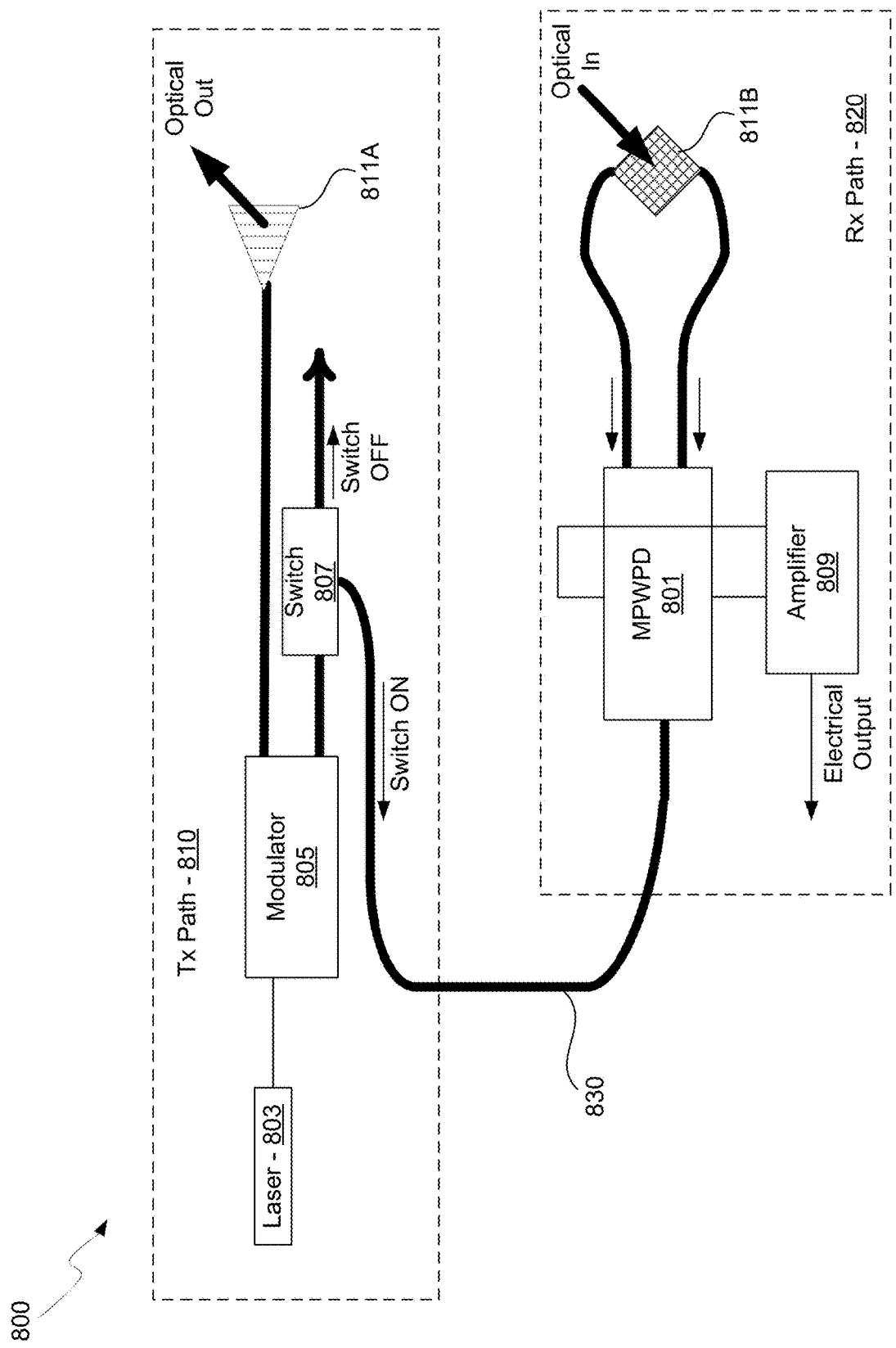
FIG. 8 illustrates an optical transceiver with built-in self-test using an optical switch and multi-port waveguide photodetector, in accordance with an example embodiment of the disclosure

FIG. 8 illustrates an optical transceiver with built-in self-test using an optical switch and multi-port waveguide photodetector, in accordance with an example embodiment of the disclosure. Referring to FIG. 8, there is shown transceiver 800 comprising a transmitter path 810, a receiver path 820, and a built-in self-test path (BIST) 830. The transmitter path 810 comprises an optical source 803, e.g., a laser, a modulator 805, an optical switch 807, and a grating coupler 811A, while the receiver path 820 comprises a multi-port waveguide photodetector 801, a grating coupler 811B, and amplifiers 809.

The photodetector 801, the laser 803, modulator 805, and grating couplers 811A and 811B, may be substantially similar to these elements described with respect to FIGS. 1A-7, for example. It should be noted that, generally speaking, the transmitter path 810 and the receiver path 820 are shown in simplified form in FIG. 8 to demonstrate the BIST capability. In an example scenario, coupler 811A comprises a single port grating coupler while coupler 811B comprises a PSGC, although the disclosure is not so limited, as any combination of couplers may be utilized depending on the desired number of inputs/outputs.

The optical switch 807 may comprise a normally-off optical switch with input waveguides, a first directional coupler, phase modulators, a second directional coupler, and output ports. Multi-input normally off switches are disclosed in application Ser. No. 15/401,337, which is hereby incorporated by reference in its entirety. When the normally off switch is in its OFF state, the optical signal received from the modulator 805 is communicated to an unused branch or to a branch with an optical attenuator, while the other modulator output is coupled to the PSGC 811A and communicated out of the chip.

When the normally off switch 807 is switched ON, one or more optical signals may be routed to the photodetector 801. In this manner, the transmitter path 810 may be directly tested on-chip prior to physically coupling optical fibers or connector to the PSGCs 811A. In addition, the normally off switch 807 also enables testing of the photodetector 801 and amplifier 809 prior to coupling external optical sources.

In an example embodiment of the disclosure, a system comprises an optical receiver on a chip, where the optical receiver comprises a multi-port waveguide photodetector having three or more input ports. A method of operating the system may comprise receiving optical signals in the receiver, coupling optical signals to the multi-port waveguide photodetector via optical waveguides in said chip, and generating an output electrical signal based on the coupled optical signals using the multi-port waveguide photodetector. The multi-port waveguide photodetector may comprise four ports coupled to two PSGCs.

The optical signals may be mixed with local oscillator signals using the multi-port waveguide photodetector. An optical signal may be communicated to one of the three or more input ports via a normally off optical switch in a transmitter path in the chip, thereby enabling built-in self-test of the transmitter path.

The optical signals may be coupled to the multi-port waveguide photodetector via S-bends at ends of the optical waveguides. The optical signals may be coupled to the multi-port waveguide photodetector via tapers at ends of the optical waveguides. A width of the multi-port waveguide photodetector on sides that are coupled to the optical waveguides may be wider than a width of the optical waveguides coupled to the sides.

The optical signals may be coupled to the one or more PSGCs via an optical fiber coupled to the chip. A PN junction in the multi-port waveguide photodetector may be arranged laterally. A PN junction in the multi-port waveguide photodetector may be arranged vertically. The multi-port waveguide photodetector may include a germanium absorbing layer. The chip may comprise a complementary metal oxide semiconductor (CMOS) photonics chip.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present invention will include all embodiments falling within the scope of the appended claims.

What is claimed is:

1. A method for communication, the method comprising:
in an optical receiver on a chip, the optical receiver comprising a multi-port waveguide photodetector having three or more input ports:
receiving optical signals in the optical receiver;
coupling one or more optical signals to different ports in a first side of the multi-port waveguide photodetector via optical waveguides in the chip;
coupling two or more optical signals to different ports in a second side opposite the first side of the multi-port waveguide photodetector via different optical waveguides in the chip; and
generating an output electrical signal based on the coupled optical signals using the multi-port waveguide photodetector.

2. The method according to claim 1, wherein the multi-port waveguide photodetector comprises four ports coupled to two polarization splitting grating couplers (PSGCs) that receive the optical signals in the chip.

3. The method according to claim 1, comprising coupling optical signals to the multi-port waveguide photodetector via S-bends at ends of the optical waveguides.

4. The method according to claim 1, comprising coupling optical signals to the multi-port waveguide photodetector via tapers at ends of the optical waveguides.

5. The method according to claim 1, wherein a width of the multi-port waveguide photodetector on the first and second sides that are coupled to the optical waveguides is wider than a width of the optical waveguides coupled to the sides.

6. The method according to claim 1, comprising coupling the optical signals to one or more grating couplers in the chip via an optical fiber coupled to the chip.

7. The method according to claim 1, wherein a PN junction in the multi-port waveguide photodetector is arranged laterally.

8. The method according to claim 1, wherein a PN junction in the multi-port waveguide photodetector is arranged vertically.

9. The method according to claim 1, wherein the multi-port waveguide photodetector comprises a germanium absorbing layer.

10. The method according to claim 1, wherein the chip comprises a complementary metal oxide semiconductor (CMOS) photonics chip.

11. The method according to claim 1, comprising mixing the optical signals with local oscillator signals using the multi-port waveguide photodetector.

12. The method according to claim 1, comprising communicating an optical signal to one of the three or more input ports via a normally off optical switch in a transmitter path in the chip, thereby enabling built-in self-test of the transmitter path.

13. A system for communication, the system comprising:
an optical receiver on a chip, the optical receiver comprising a multi-port waveguide photodetector having three or more input ports, the optical receiver being operable to:
receive optical signals in the optical receiver;
couple one or more optical signals to different ports in a first side of the multi-port waveguide photodetector via optical waveguides in the chip;
couple two or more optical signals to different ports in a second side opposite the first side of the multi-port waveguide photodetector via different optical waveguides in the chip; and
generate an output electrical signal based on the coupled optical signals using the multi-port waveguide photodetector.

14. The system according to claim 13, wherein the multi-port waveguide photodetector comprises four ports coupled to two polarization splitting grating couplers (PSGCs) that receive the optical signals in the chip.

15. The system according to claim 13, wherein the optical receiver is operable to couple optical signals to the multi-port waveguide photodetector via S-bends at ends of the optical waveguides.

16. The system according to claim 13, wherein the optical receiver is operable to couple optical signals to the multi-port waveguide photodetector via tapers at ends of the optical waveguides.

17. The system according to claim 13, wherein a width of the multi-port waveguide photodetector on the first and second sides that are coupled to the optical waveguides is wider than a width of the optical waveguides coupled to the sides.

18. The system according to claim 13, wherein the optical receiver is operable to couple the optical signals to one or more grating couplers in the chip via an optical fiber coupled to the chip.

19. The system according to claim 13, wherein a PN junction in the multi-port waveguide photodetector is arranged laterally.

20. The system according to claim 13, wherein a PN junction in the multi-port waveguide photodetector is arranged vertically.

21. The system according to claim 13, wherein the multi-port waveguide photodetector comprises a germanium absorbing layer in a complementary metal oxide semiconductor (CMOS) photonics chip.

22. The system according to claim 13, wherein the optical receiver is operable to mix the optical signals with local oscillator signals using the multi-port waveguide photodetector.

23. The system according to claim 13, wherein the optical receiver is operable to communicate an optical signal to one of the three or more input ports via a normally off optical switch in a transmitter path in the chip, thereby enabling built-in self-test of the transmitter path.

24. A system for communication, the system comprising:
an optical receiver on a chip, the optical receiver comprising one or more grating couplers and a multi-port germanium waveguide photodetector having four input ports, the optical receiver being operable to:
receive optical signals via said one or more PSGCs;
couple one or more optical signals to different ports in a first side of the multi-port waveguide photodetector via optical waveguides in the chip;
couple two or more optical signals to different ports in a second side opposite to the first side of the multi-port waveguide photodetector via different optical waveguides in the chip; and
generate an output electrical signal based on the coupled optical signals using the multi-port waveguide photodetector.

* * * * *